United States Patent
Barone

(10) Patent No.: US 11,715,142 B2
(45) Date of Patent: Aug. 1, 2023

(54) SYSTEM FOR DISPLAYING WHEEL STYLES AND ARTWORK ON VEHICLES

(71) Applicant: Stephen Barone, Carlsbad, CA (US)

(72) Inventor: Stephen Barone, Carlsbad, CA (US)

( * ) Notice: Subject to any disclaimer, the term of this patent is extended or adjusted under 35 U.S.C. 154(b) by 20 days.

(21) Appl. No.: 17/368,768

(22) Filed: Jul. 6, 2021

(65) Prior Publication Data
US 2021/0334870 A1 Oct. 28, 2021

Related U.S. Application Data

(63) Continuation-in-part of application No. 16/049,660, filed on Jul. 30, 2018, now abandoned.

(51) Int. Cl.
*G06Q 30/00* (2023.01)
*G06Q 30/0601* (2023.01)
(Continued)

(52) U.S. Cl.
CPC ..... *G06Q 30/0621* (2013.01); *G02B 27/0172* (2013.01); *G06F 16/2457* (2019.01); *G06Q 30/0643* (2013.01); *G06T 19/006* (2013.01); *G06T 19/20* (2013.01); *G06V 20/20* (2022.01); *H04N 9/3147* (2013.01); *G02B 2027/0174* (2013.01)

(58) Field of Classification Search
CPC .......... G06Q 30/06–08; G06Q 30/0601–0645; G06Q 30/08; G02B 27/0172; G02B 2027/0174; G02B 2027/0138; G02B 2027/014; G06F 16/2457; G06T 19/006; G06T 19/20; G06T 2219/2024; G06V 20/20; H04N 9/3147; H04N 9/3182; H04N 9/3185
USPC .............................................. 705/26.1-27.2
See application file for complete search history.

(56) References Cited

U.S. PATENT DOCUMENTS

| 2002/0069121 A1* | 6/2002 | Jain .................... G06Q 30/0613 705/26.8 |
| 2020/0034904 A1* | 1/2020 | Barone ............... G06F 16/9535 |
| 2020/0234498 A1* | 7/2020 | Price ..................... G06V 20/20 |

OTHER PUBLICATIONS

Demmitt, Jacob, "Virtual car shopping on a HoloLens? Volvo says it's coming next year thanks to Microsoft partnership," Nov. 19, 2015, GeekWire, accessed at [https://www.geekwire.com/2015/volvo-to-launch-virtual-showroom-using-microsofts-hololens-sometime-next-year/] (Year: 2015).*

* cited by examiner

*Primary Examiner* — Jeffrey A. Smith
*Assistant Examiner* — Lindsey B Smith
(74) *Attorney, Agent, or Firm* — Edmond DeFrank

(57) ABSTRACT

The embodiments disclose an apparatus including a system and method for displaying wheel styles and artwork on vehicles to allow customers to make an informed purchasing decision at the dealer location regarding different wheel styles or paint colors and paint pattern artwork choices to purchase for their vehicle. This system and method enables a sales person to show a customer a variety of wheel styles, tires, paint colors, paint patterns and various decorations, such as pinstriping, will look on the customers actual vehicle by holograph or conventional projection of the products displayed on the vehicle. Purchasers can also use a smartphone mobile application to superimpose products onto a photo of their vehicle on a smartphone display screen or view images in combination with a smartphone projector or virtual reality headset 3D viewer and their smartphone to get a complete 3D view of the product choices that the user can make for their vehicle.

5 Claims, 12 Drawing Sheets

(51) Int. Cl.
*H04N 9/31* (2006.01)
*G06F 16/2457* (2019.01)
*G06T 19/20* (2011.01)
*G06T 19/00* (2011.01)
*G02B 27/01* (2006.01)
*G06V 20/20* (2022.01)

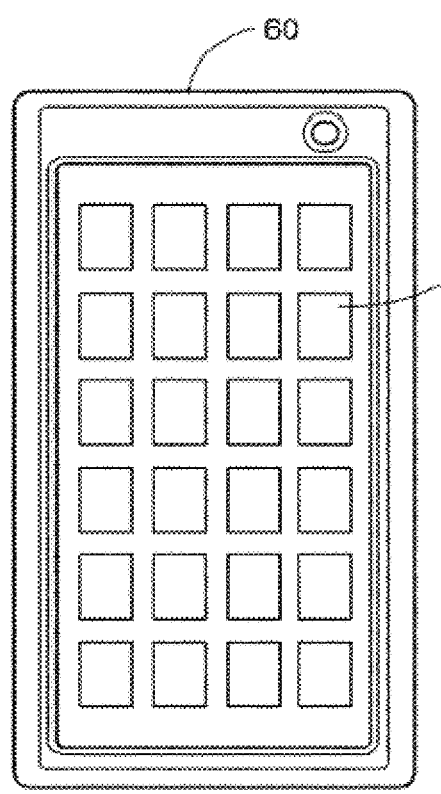
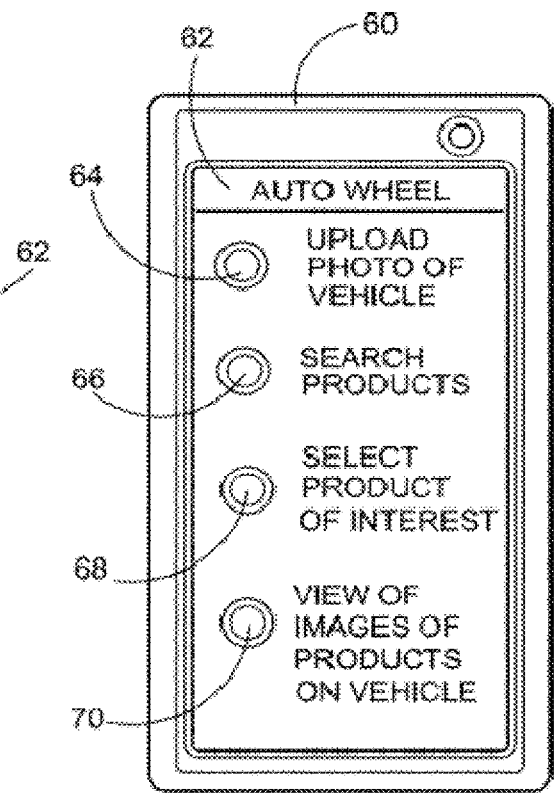
FIG. 7  FIG. 8
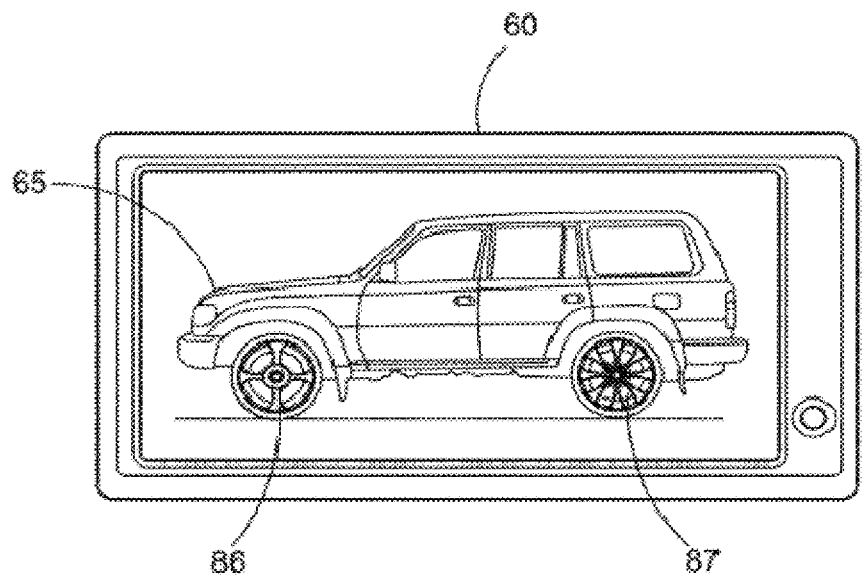
FIG. 9

SYSTEM FOR DISPLAYING WHEEL STYLES AND ARTWORK ON VEHICLES

CROSS-REFERENCE TO RELATED APPLICATIONS

This Patent Application is a Continuation-in part and claims priority to U.S. Patent Application, U.S. Ser. No. 16/049,660 filed on Jul. 30, 2018, entitled: "SYSTEM AND METHOD FOR DISPLAYING WHEEL STYLES AND ARTWORK ON VEHICLES", by Stephen Barone, the U.S. Patent Application being incorporated herein by reference.

FIELD OF THE INVENTION

Provided is a System and Method for Displaying Wheel Styles and Artwork on Vehicles to allow customers to make an informed purchasing decision at the dealer location regarding different wheel styles or paint colors and paint pattern artwork choices to purchase for their vehicle. More particularly, this system and method enables a sales person to show a customer a variety of wheel styles, tires, paint colors, paint patterns and various decorations, such as pin-striping, will look on the customers actual vehicle by holograph or conventional projection of the products displayed on the vehicle. Purchasers can also use a smartphone mobile application (app) to superimpose products onto a photo of their vehicle on a smartphone display screen or in combination with a smartphone projector or virtual reality (VR) headset 3D viewer and their smartphone to get a complete 3D view of the product choices that the user can make for their vehicle.

BACKGROUND OF THE INVENTION

For many years the appearance of personal vehicles has been very desirable especially among young drivers. Making their vehicle differ from the stock look gave the drivers a great deal of pride in what they were driving. The aftermarket automotive parts and decorative paint jobs have become a very lucrative market. But it is very difficult for many to be able to visualize what these items might look like on their particular vehicle.

Too often people have been very unhappy with what their vehicle looks like after they have purchased something and put it on their vehicle, but by then they are stuck with it.

The present application describes a new and unique sales method where a sales person can show a customer just how a variety of embellishments can be shown by the means of holograph or projection that can be displayed on their vehicle and they can take their pick or ask for advice from a companion.

Numerous innovations for photographic processes have been provided in the prior art that is described as follows. Even though these innovations may be suitable for the specific individual purposes to which they address, they differ from the present system as hereinafter contrasted. The following is a summary of those prior art patents most relevant to the System and Method for Displaying Wheel Styles and Artwork on Vehicles at hand, as well as a description outlining the difference between the features of the present application and those of the prior art.

U.S. Pat. No. 9,865,186 of Trevor Seal describes methods, systems, and apparatuses for displaying or projecting images on a vehicle are described herein. The methods include receiving location data of a vehicle, determining content corresponding to the location, and providing images corresponding to the content to projectors for display on a side of a vehicle. The systems include a vehicle, projectors mounted on the vehicle such that an image created by the projector is cast on a surface of the vehicle, and a control module configured to provide images to the one or more projectors for display on a side of the vehicle. The apparatuses include a location module that determines a current location of a vehicle, a content selection module drat determines a content corresponding to the current location, and a display module that provides images corresponding to the content to one or more projectors for display on a side of a vehicle.

This patent describes methods, systems, and apparatuses for displaying or projecting images on a vehicle. The systems include a vehicle, projectors mounted on the vehicle such that an image created by the projector is cast on a surface of the vehicle, and a control module configured to provide images to the one or more projectors for display on a side of the vehicle. The apparatuses include a location module that determines a current location of a vehicle. This patent does not describe a new and unique sales method where a sales person can show a customer just how a variety of embellishments can be shown by the means of cell phone apps and a holograph or projection system that will display images on their vehicle and photographed on a cell phone to be viewed with a VR headset. It does not provide a unique sales tool that can be leased or sold to different automotive service vendors. U.S. Pat. No. 9,922,583 of Tyler Moe describes a vehicle window projection system that includes projection devices, mounting devices, image processing unit, and a projection film. The projection device is used to project an image onto the projection file thereby displaying an image on a window with the projection film attached thereto. The projection device can include a projector housing rotatably mounted to a mounting bracket that is mounted to a panel in the vehicle.

This patent describes a vehicle window projection system used to project an image onto the projection file thereby displaying an image on a window with the projection film. This patent does not describe a new and unique sales method where a sales person can show a customer just how a variety of embellishments can be seen on their vehicle.

U.S. Pat. No. 7,864,309 of De Sloovere et al. describes a sensor and method of determining the orientation of an object, such as the alignment characteristics of a tire and wheel assembly mounted on a vehicle, includes projecting a plurality of light planes from a first light projector onto a tire and wheel assembly to form a plurality of generally parallel illumination lines on a tire of the tire and wheel assembly, receiving a reflected image of at least some of the illumination lines with a photo electric device reflected from the tire at an angle relative to a projecting angle of the first light projector, and determining a plane defined by spatial coordinates from a selected point located on each illumination line imaged by the photo electric device, with the plane representing the orientation of the tire and wheel assembly.

This patent describes a sensor and method of determining the orientation of an object, such as the alignment characteristics of a tire and wheel assembly mounted on a vehicle but does not describe a new and unique sales method where a sales person can show a customer just how a variety of embellishments can be seen on their vehicle. US Patent Application Publication No. 2017/0017847 of Satoshi Nakaya describes a vehicle evaluation device that includes a first projection target, a first projector, and a controller. The first projection target enables projection of an image thereon and is capable of changing positions. The first projector projects an image onto the first projection target. The controller controls the position of the first projection target and performs control for changing an image to be projected by the first projector according to the position of the first projection target.

This patent describes a vehicle evaluation device but does not describe a new and unique sales method where a sales person can show a customer just how a variety of embellishments can be seen on their vehicle.

US Patent Application Publication No. 2006/0143957 of Mahmood Salehi describes advertising or information displays which can be shown on screens provided on walls of a van-bodied road vehicle. The displays comprise video or still images back projected onto the screens from projectors located within the vehicle body. The projectors have control units with stored digital image data connected to a local computer unit which operates the projectors. The computer units of different vehicles are connected by wireless links to a central management server which controls operation.

This patent describes advertising or information displays which can be shown on screens provided on walls of a van-bodied road vehicle. The displays comprise video or still images back projected onto the screens from projectors located within the vehicle body but does not describe a new and unique sales method where a sales person can show a customer just how a variety of embellishments can be seen on their vehicle. U.S. Pat. No. 3,576,372 of James Baker describes a projector, which mounts on the front wheel of a vehicle and projects the image of a reference mark during alignment of the wheels. The reference mark is mounted on a pendulum which swings in front of a lamp to give, in conjunction with the projected image of reference indicia which is fixed in the projector, an indication of the tilt of the projector and the wheel on which it is mounted. The pendulum has an aluminum portion which swings through the magnetic field established by opposite, spaced apart, pole faces of a permanent magnet. The motion of the nonmagnetic, current-conducting pendulum portion through the magnetic field induces currents in the pendulum portion which damps the motion of the pendulum. This patent describes a projector, which mounts on the front wheel of a vehicle, and projects the image of a reference mark during alignment of the wheels. This patent does not describe a new and unique sales method where a sales person can show a customer just how a variety of embellishments can be shown by the means of cell phone apps and a holograph or projection system that will display images on their vehicle or photographed on a cell phone to be viewed with a VR headset. It does not provide a unique sales tool that can be leased or sold to different automotive service vendors.

In this respect, before explaining at least one embodiment of the present application in detail it is to be understood that the design is not limited in its application to the details of construction and to the arrangement of the components set forth in the following description or illustrated in the drawings. The System and Method for Displaying Wheel Styles and Artwork on Vehicles is capable of other embodiments and of being practiced and carried out in various ways. Also, it is to be understood that the phraseology and terminology employed herein are for the purpose of description and should not be regarded as limiting.

SUMMARY OF THE INVENTION

The advantage of the preferred and alternate embodiments of the System an. Method for Displaying Wheel Styles and Artwork on Vehicles is having the ability of seeing on your particular vehicle various products which you have the possibility of purchasing.

Another advantage of the System and Method for Displaying Wheel Styles and Artwork on Vehicles is that it is a system which can be a sales tool to be leased or sold to other venders.

Another advantage of the System and Method for Displaying Wheel Styles and Artwork on Vehicles is being able to see a wide variety of different products that might be used on your vehicle.

And another advantage is to create a System and Method for Displaying Wheel Styles and Artwork on Vehicles where a customer is not pressurized to make the decision on the spot.

And another advantage is to create a System and Method for Displaying Wheel Styles and Artwork on Vehicles that the sales person can be able to charge for the process even if the customer declines to not make the purchase.

And another advantage is to create a System and Method for Displaying Wheel Styles and Artwork on Vehicles where a customer may take a copy of the information on their cell phone, view it with a VR headset or projector and take it home and discuss the decision with family or friends.

A further advantage is to create System and Method for Displaying Wheel Styles and Artwork on Vehicles where the customer is completely satisfied with the purchase that was made.

These together with other advantages of the System and Method for Displaying Wheel Styles and Artwork on Vehicles, along with the various features of novelty, which characterize this application, are pointed out with particularity in the claims annexed to and forming a part of this disclosure.

For a better understanding of the System and Method for Displaying Wheel Styles and Artwork on Vehicles, its operating advantages and the specific objects attained by its uses, reference should be made to the accompanying drawings and descriptive matter which there are illustrated preferred embodiments of this application. There has thus been outlined, rather broadly, the more important features of the System and Method for Displaying Wheel Styles and Artwork on Vehicles in order that the detailed description thereof that follows may be better understood, and in order that the present contribution to the art may be better appreciated. There are additional features of the System and Method for Displaying Wheel Styles and Artwork on Vehicles that will be described hereinafter, and which will form the subject matter of the claims appended hereto.

With the preferred embodiment of the System and Method for Displaying Wheel Styles and Artwork on Vehicles the sales person first will explain the photo sales procedure to the customer. In regard to the wheel styles, if the customer agrees the vehicle is positioned inside or outside of the service bay. One or more projectors are positioned with several brands uploaded into a program/software. Background material is placed over the wheels. The vehicles can be motorcycles, racing cars, vans, busses, trucks, mopeds, SUV's and all other types of vehicles other than automobiles.

The background material covering the wheels will be expandable and retractable/collapsible similar to a sunshade for a windshield made of aluminum, plastic or rubber. The background/material that will be projected on shall be a matt white or grey neutral vinyl reflective surface and may have a laminated textile woven base. This material is commonly found on movie theater projection screens. It can be purchased by the square foot. The expandable/retractable casing holding the material may be round or octagonal with a pop/snap out feature expanding to fit snug in the wheel well with a rubber coat for a gripping purpose.

For the decision on wheels and tires several styles, sizes, colors and brands of wheels, tires and rims can be viewed within minutes. A holograph or projection is displayed on the plain background on the vehicle. The consumer would usually have to wait for wheels/rims to be mounted and dismounted from their vehicle. Often the desired wheels and tires are not in stock. Often the consumer will opt out of trying on wheels due to time constraints.

With the alternate embodiment of the System and Method for Displaying Artwork on the Vehicle the sales person first will explain the photo sales procedure to the customer. If the customer agrees the vehicle is positioned inside or outside of the service bay. A projector is positioned to the side and above the vehicle with several decorative styles uploaded into a program/software. With the click of a button the designs can be visualized instantly on the sides and top. A holograph or projection is displayed on the vehicle by the means of an overhead projector mounted above and to the side of the vehicles to display the side, hood, roof and trunk with a variety of graphic designs.

With respect to the above description then, it is to be realized that the optimum dimensional relationships for the parts of the System and Method for Displaying Wheel Styles and Artwork on Vehicles, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present design.

Therefore, the foregoing is considered as illustrative only of the principles of the System and Method for Displaying Wheel Styles and Artwork on Vehicles. Further, since numerous modifications and changes will readily occur to those skilled in the art, it is not desired to limit this application to the exact construction and operation shown and described, and accordingly, all suitable modifications and equivalents may be resorted to, falling within the scope of this application.

While the System and Method for Displaying Wheel Styles and Artwork on Vehicles has or will be described for the sake of grammatical fluidity with functional explanations, it is to be expressly understood that the claims, unless expressly formulated under 35 USC 112, or similar applicable law, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112, or similar applicable law. The System and Method for Displaying Wheel Styles and Artwork on Vehicles can be better visualized by turning now to the following drawings wherein like elements are referenced by like numerals.

BRIEF DESCRIPTION OF THE DRAWINGS

The accompanying drawings, which are incorporated in and form a part of this specification, illustrate embodiments of the System and Method for Displaying Wheel Styles and Artwork on Vehicles and together with the detailed description, serve to explain the principles of this application.

FIG. 7 depicts a typical smartphone with a typical number of mobile app icons including an AUTO WHEEL app icon.

FIG. 8 depicts a typical smartphone with an AUTO WHEEL mobile app open illustrating the steps and procedures activated by touching various buttons on the app for viewing automobile wheel, tires and rim designs on a photo representative of the mobile app user's/customer's vehicle.

FIG. 9 depicts a conventional smartphone with the AUTO WHEEL mobile app open illustrating a photo of a user's/customer's vehicle displaying two different rim products to show the user/customer what those products would look like on the vehicle following a purchase and installation of the products.

DETAILED DESCRIPTION OF THE PREFERRED EMBODIMENTS

As required, detailed embodiments of the present System and Method for Displaying Wheel Styles and Artwork on Vehicles are disclosed herein, however, it is to be understood that the disclosed embodiments are merely exemplary of the application that may be embodied in various forms. Therefore, specific functional and structural details disclosed herein are not to be interpreted as limiting, but merely as basic for the claims and as a representative basis for teaching one skilled in the art to variously employ the present application in virtually any appropriately detailed structure.

Figure 1:
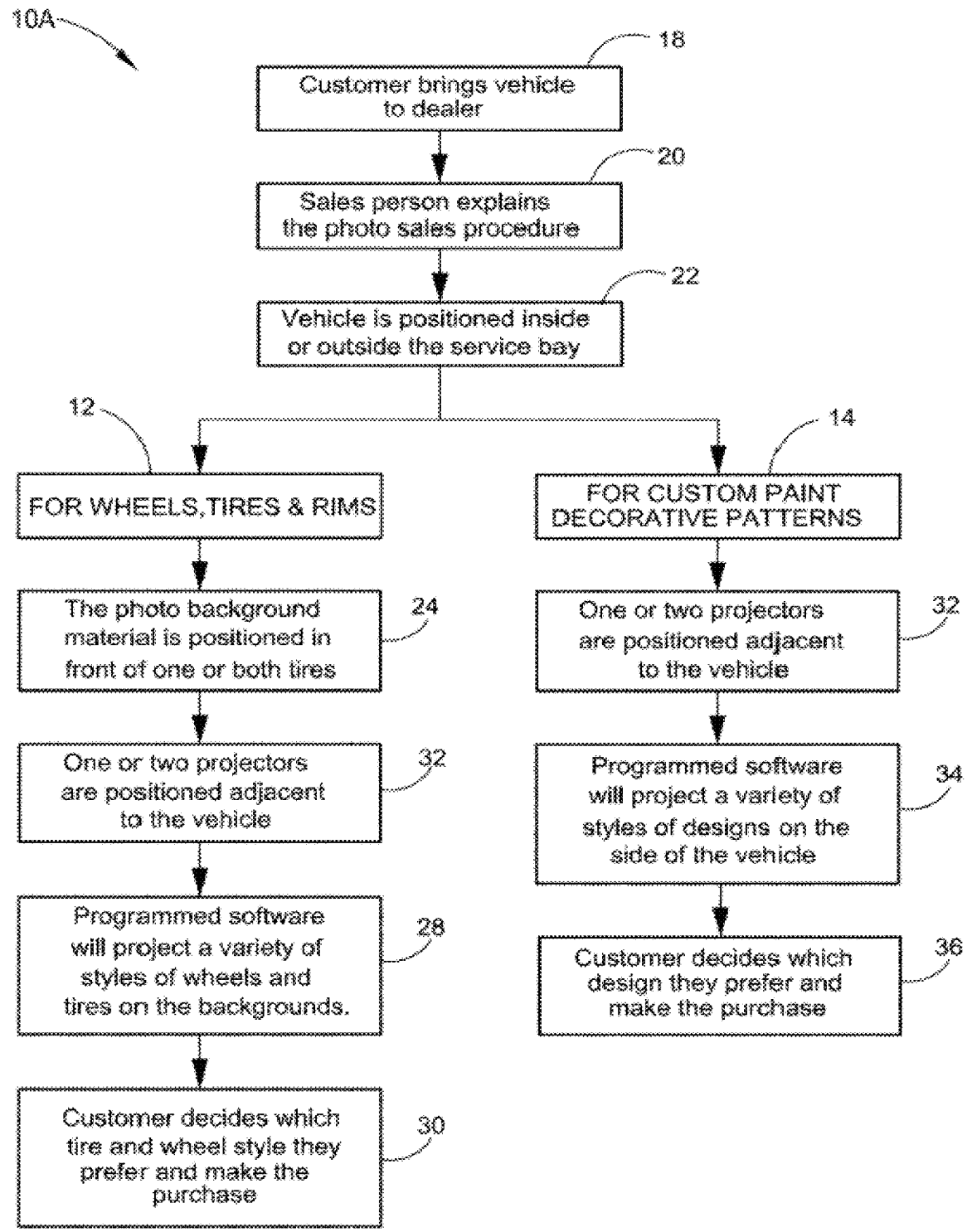
FIG. 1 depicts a block diagram illustrating the steps taken for both the purchase of wheels, tires and rims and those steps taken for the purchase of custom decorative paint colors and/or patterns on their vehicle, wherein both systems work on site and using the actual vehicle of the customer.

FIG. 1 depicts the preferred embodiment of the System and Method for Displaying Wheel Styles 10A on the customer's actual vehicle. The block diagram illustrates the steps taken for the purchase of wheels, tires and rims viewing step 12 and those steps taken for the purchase of custom decorative paint patterns 14 on their personal vehicle 16. The customer first brings the vehicle 16 to the dealer step 18 and the sales person explains the photo sales procedure step 20 then the customer's actual vehicle 16 is positioned inside or outside of the service bay step 22.

For the wheels, tires and rims viewing step 12 the photo background material is positioned in front of one or both tires 24. One or two projectors 32 are positioned adjacent to the vehicle 16 where programmed software stored on a computer will project a variety of styles of wheels, tires and rims 12 for viewing on the fabric backgrounds step 28 covering the tires. The customer decides which wheel, tire or rim 12 styles viewed they prefer and makes the purchase step 30.

For the vehicle paint colors, custom paint and decorative patterns viewing step 14 one or two projectors step 32 are positioned adjacent to the personal vehicle 16 where programmed software stored on a computer will project a variety of decorative patterns for viewing step 14 on the side and top step 34 of the personal vehicle 16. Then after viewing select products of interest, the customer will then decide which paint color or paint pattern design they prefer and make the purchase step 30.

Figure 2:
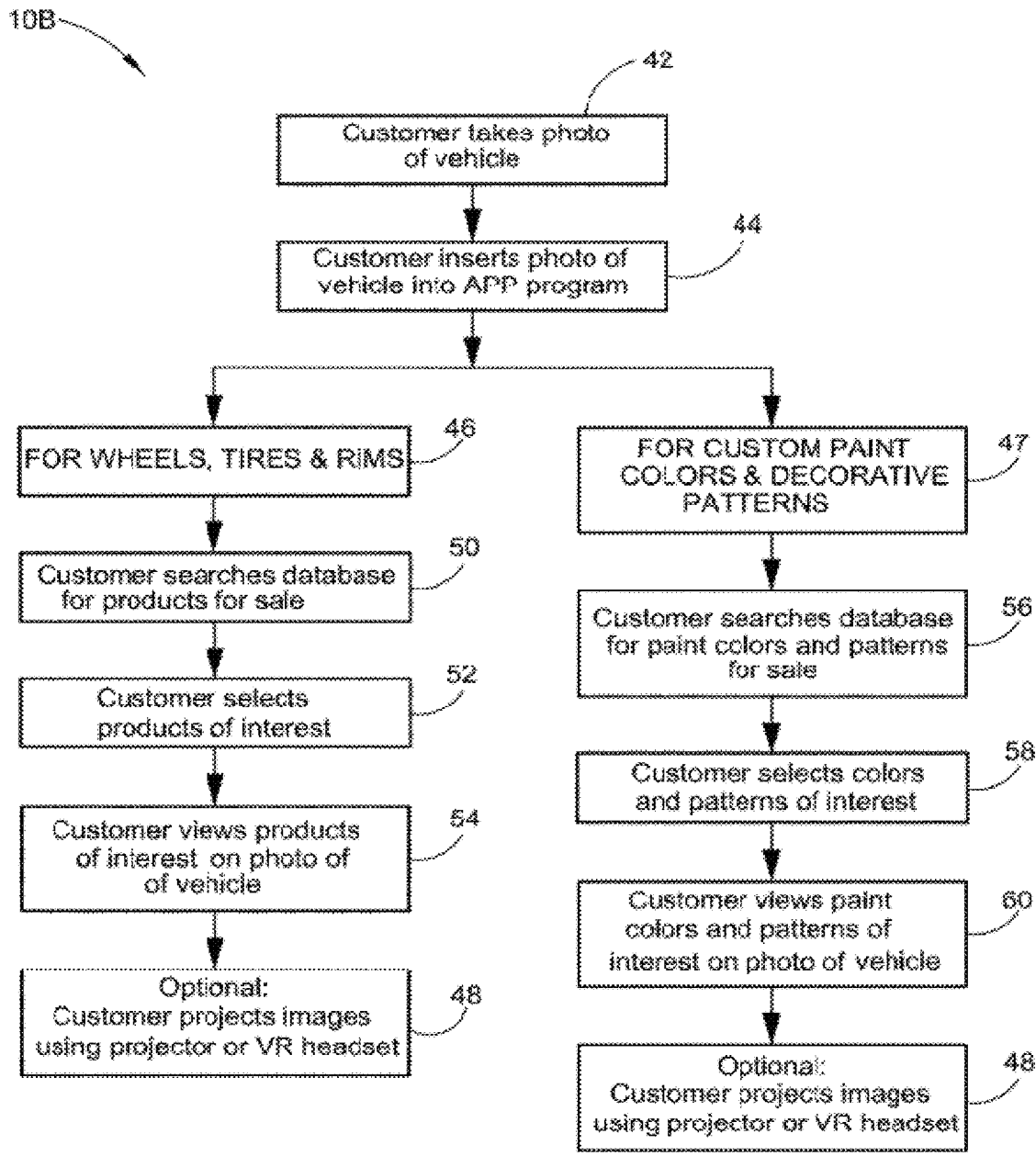
FIG. 2 depicts a block diagram illustrating the steps taken for both the purchase of wheels, tires and rims and those steps taken for the purchase of custom decorative paint colors and/or patterns on their vehicle, wherein both systems work on a smartphone app and using a photo representation of the actual vehicle of the customer.

FIG. 2 depicts the alternate embodiment of the System and Method for Displaying Wheel Styles and Artwork on Vehicles 10B on a smartphone mobile app using a photo of the user's/customer's vehicle in a photo with the products being superimposed thereon. Referring now to FIG. 2, there is shown a block diagram illustrating steps taken where the customer views the vehicle photo with superimposed products to make a decision on which product to purchase. This viewing can be directly on the smartphone display screen or done using a smartphone projector 32 images or VR headset 48 images, including 3D videos of the vehicle (see FIGS. 13 and 14 below). To start the mobile app system and method, the customer takes a photo of their personal vehicle step 42 and inserts that photo into the mobile app program step 44, that is, into the AUTO WHEEL mobile app program step 46 for wheels tires and rims, or the AUTO DECOR mobile app program step 47 for custom paint colors and decorative paint patterns. For wheels tires and rims viewing, the customer searches a computer database for products for sale step 50, selects products of interest step 52 then views products of interest step 54 superimposed on the photo of their personal vehicle and can optionally project products that are superimposed images on the vehicle photo by using a smartphone display screen, a projector or VR headset step 48.

For custom paint colors and decorative patterns step 47 the customer searches a computer database for paint colors and paint patterns for sale step 56. The customer then selects paint colors and patterns of interest step 58 and can then view them on the photo of their personal vehicle step 60 using a smartphone display screen, a projector or VR headset step 48.

Figure 3:
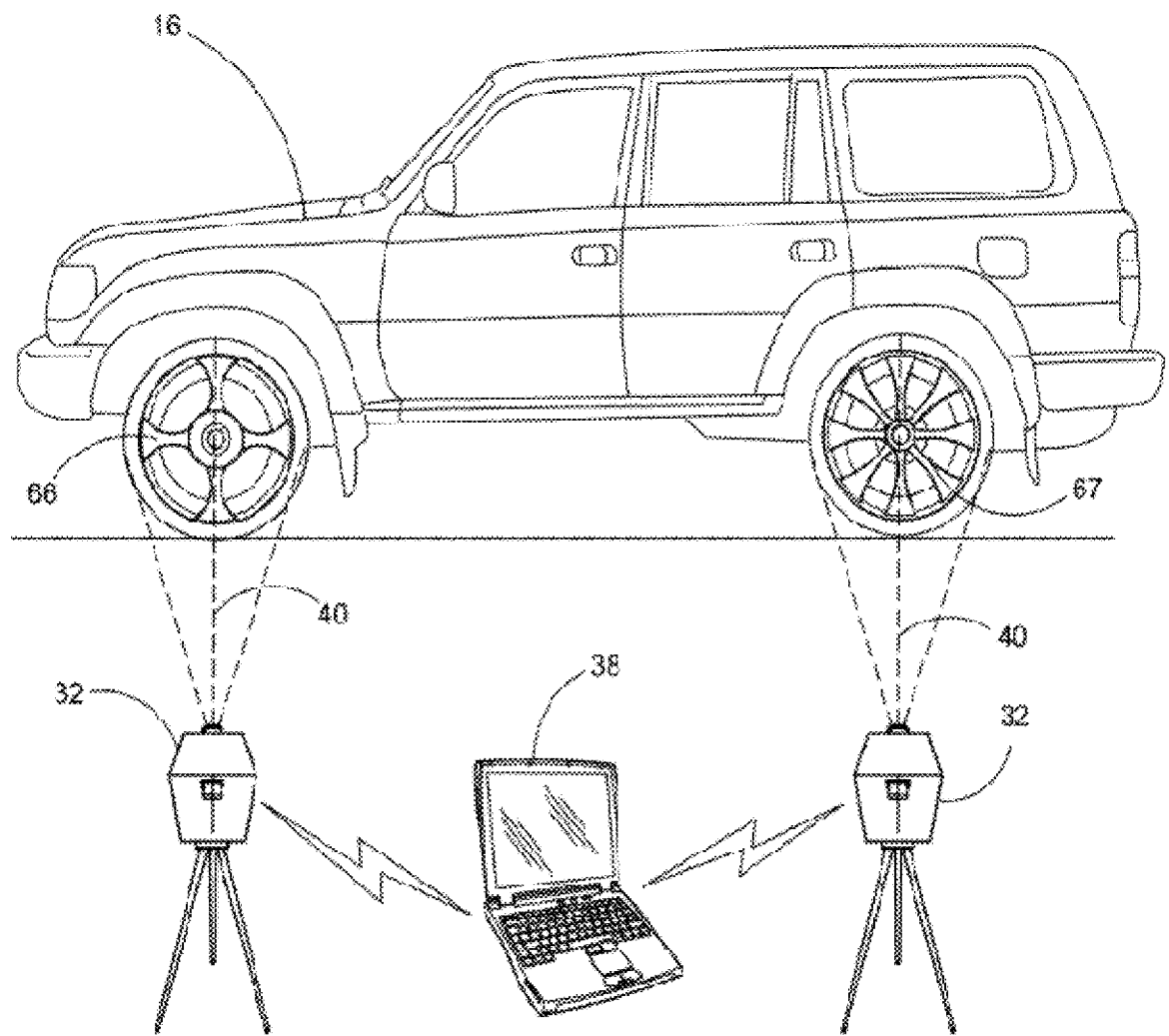
FIG. 3 depicts a laptop computer with Wi-Fi connection to two projectors using a conventional projection system or holographic projection system for displaying different styles of wheels, tires and rims on the actual vehicle of a customer at a dealer or other on site location.

FIG. 3 depicts a laptop computer 38 containing a stored database of various wheel, tire and rim products, and also with a Wi-Fi connection to two projectors 32 using a conventional or holograph projection system 40 displaying different styles of wheels, tires and rims 66 and 67 on a customer's personal vehicle 16 on site at the dealer or showroom.

Figure 4:
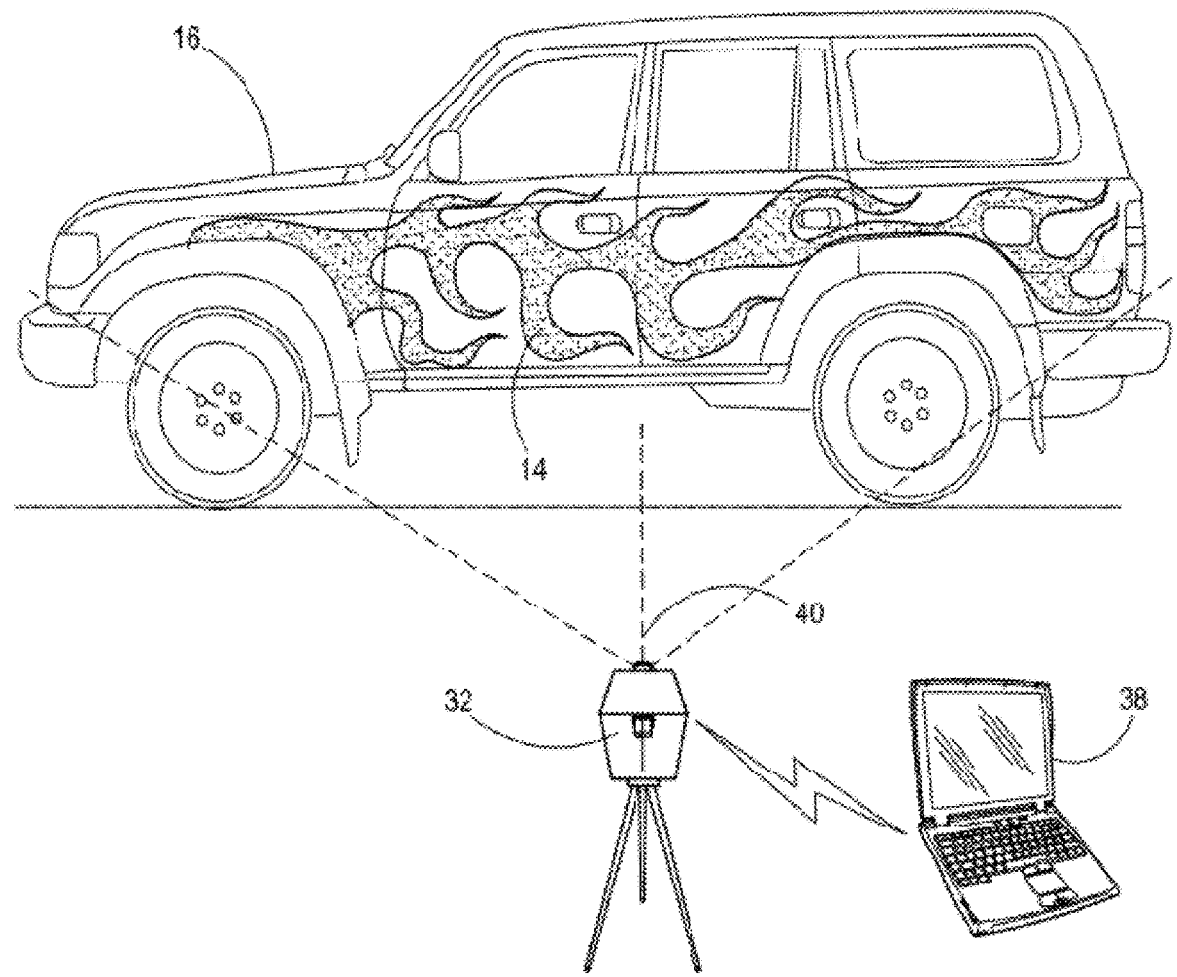
FIG. 4 depicts a laptop computer with Wi-Fi connection to one projector using a conventional projection system or holographic projection system for displaying different paint colors, paint patterns and pinstriping on the actual vehicle of a customer at a dealer or other on site location.

FIG. 4 depicts a laptop computer 38 containing a stored database of various wheel, tire and rim products, and also with Wi-Fi connection to one projector 32 using a conventional or holograph projection system 40 to display paint colors, or as here decorative paint patterns 14 on the customer's actual vehicle 16 on site.

Figure 5:
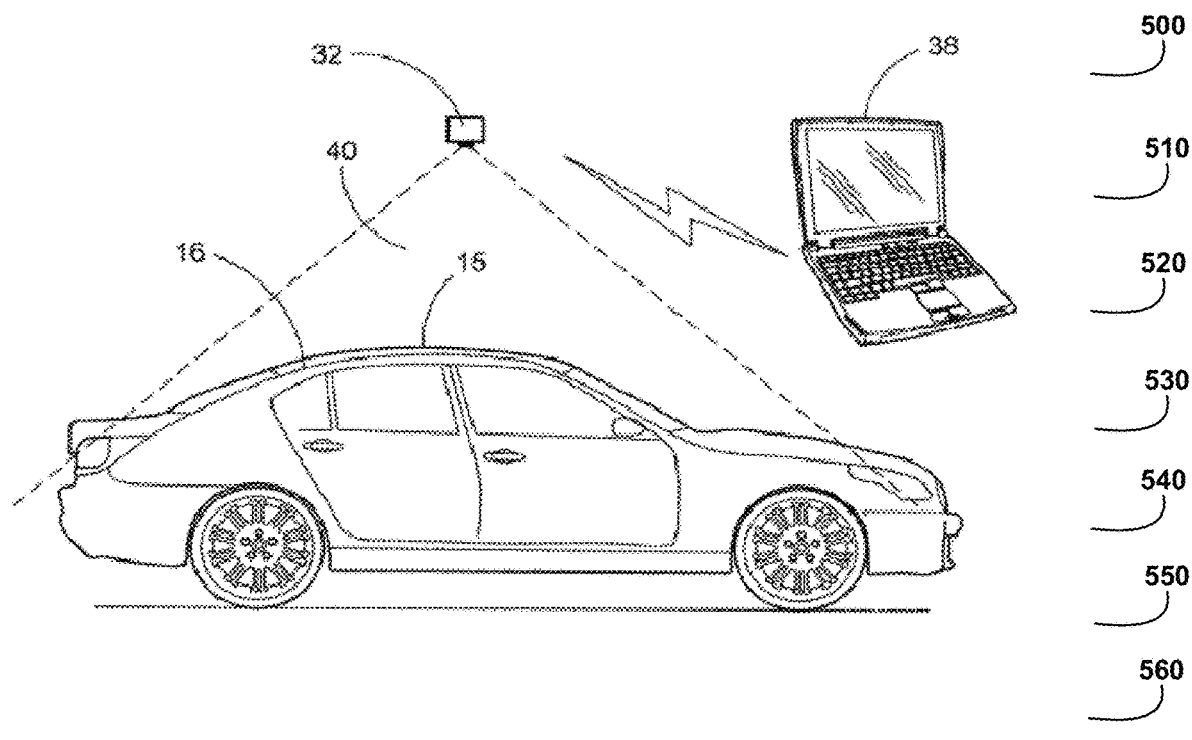
FIG. 5 depicts a side view of a vehicle with a single projector using a conventional projection system or holographic projection system for displaying different paint colors, paint patterns and pinstriping on the on the top of the car of an actual vehicle of a customer at a dealer or other on site location.

FIG. 5 depicts a side view of a customer's actual vehicle 16 on site with a laptop computer 38 containing a stored database of various paint color or paint pattern products, and also with Wi-Fi connection to a single projector 32 positioned above the vehicle 16 using a conventional or holograph projection system 40 to display paint colors and/or decorative paint patterns 15 on the side of the customers actual vehicle 16 on site at the dealer or showroom.

Figure 6:
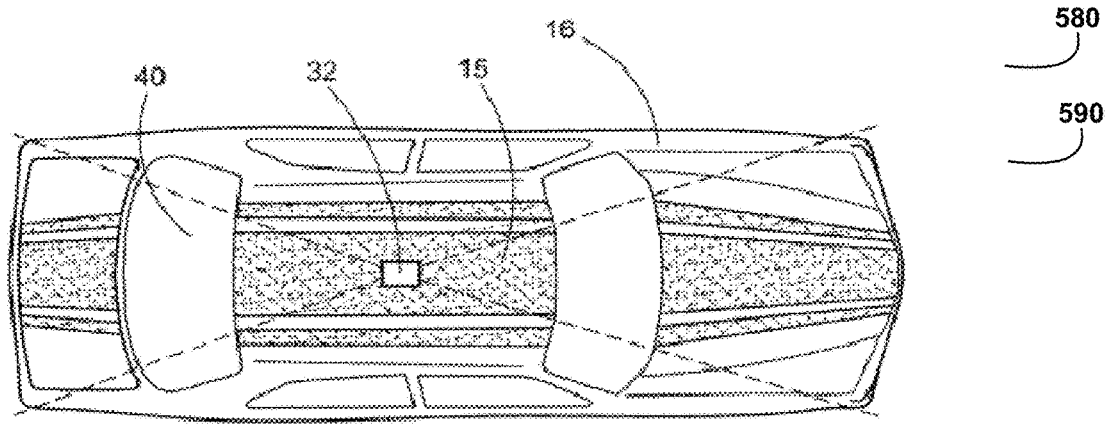
FIG. 6 depicts the top view of a vehicle with a single projector using a conventional projection system or holographic projection system for displaying different paint colors, paint patterns and pinstriping on the on the top of the car of an actual vehicle of a customer at a dealer or other on site location.

FIG. 6 depicts the top view of a customer's actual vehicle 16 on site with a laptop computer 38 containing a stored database of various paint color or paint pattern products, and also with Wi-Fi connection to a single projector 32 positioned above the vehicle 16 using a conventional or holograph projection system 40 to display paint colors and/or decorative paint patterns 15 on the top of the customer's actual vehicle 16 on site at the dealer or showroom.

FIG. 7 depicts atypical smartphone 60 with an AUTO WHEEL mobile app 62 installed.

FIG. 8 depicts a typical smartphone 60 with an AUTO WHEEL mobile app 62 open illustrating the procedures for locating different automobile wheel tire and rim designs and superimposing those products onto a photo of the customer's vehicle. The top button 64 will upload a previously taken photo of the vehicle, with the second button 66 giving the customer the capability of searching database stored wheel, tire and rim products. The third button 68 will give the user the ability to select a product of interest and the fourth button 70 the user/customer can superimpose the products selected on the photo of the vehicle and view those superimposed images of the products on the vehicle on the smartphone display screen, a smartphone projector or a VR headset.

FIG. 9 depicts a conventional smartphone 60 with a photo of a personal vehicle 65 with two different wheels, tires and rim products 86 and 87 superimposed on the photo of the vehicle.

Figure 10:
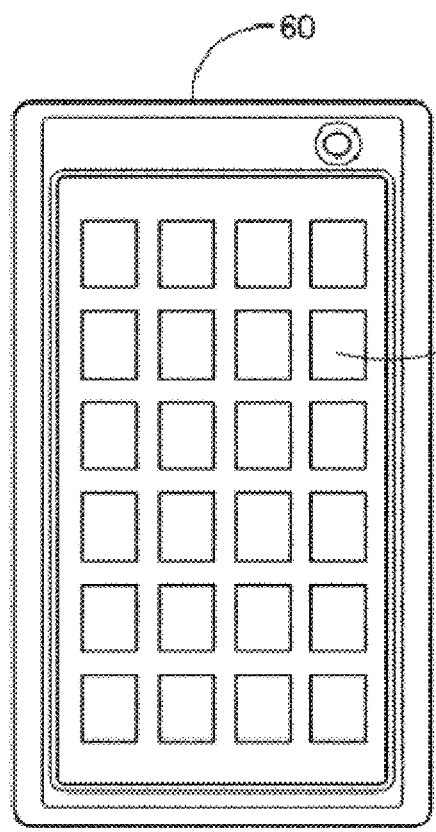
FIG. 10 depicts a typical smartphone with a typical number of mobile app icons including an AUTO DECOR app icon.

FIG. 10 depicts a typical cell phone 60 with an AUTO DECOR mobile app 74 installed.

Figure 11:
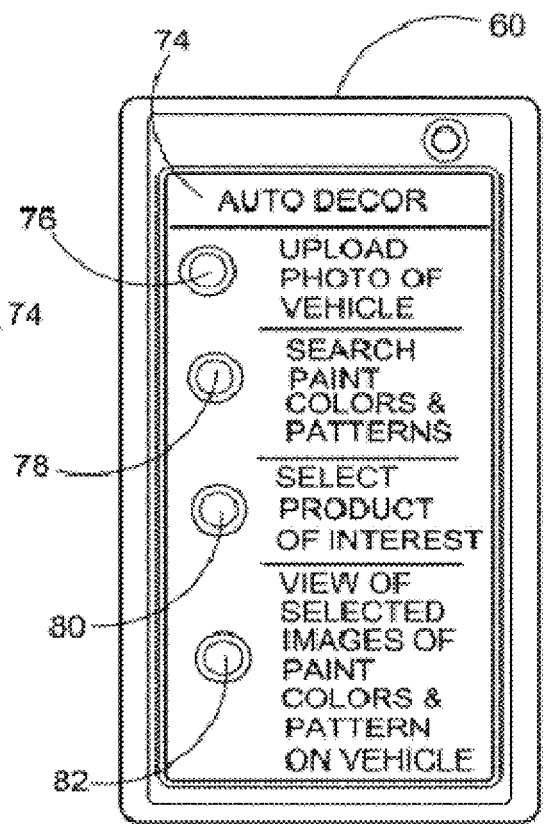
FIG. 11 depicts a typical smartphone with an AUTO DECOR mobile app open illustrating the steps and procedures activated by touching various buttons on the app for viewing automobile paint colors, paint patterns, and pinstriping designs on a photo representative of the mobile app user's/customer's vehicle.

FIG. 11 depicts atypical cell phone 60 with AUTO DECOR mobile app 74 open illustrating the procedures for locating different automobile paint color, paint patterns and pinstriping designs and superimposing those products onto a photo of the customer's vehicle. The top button 76 will upload a previously taken photo of the vehicle, with the second button 78 giving the customer the capability of searching database stored paint color, paint patterns and pinstriping design products. The third button 80 will give the user the ability to select a product of interest and the fourth button 82 the user/customer can superimpose the products selected on the photo of the vehicle and view those superimposed images of the products on the vehicle on the smartphone display screen, a smartphone projector or a VR headset. This would include side scoops, hood scoops and vent products.

Figure 12:
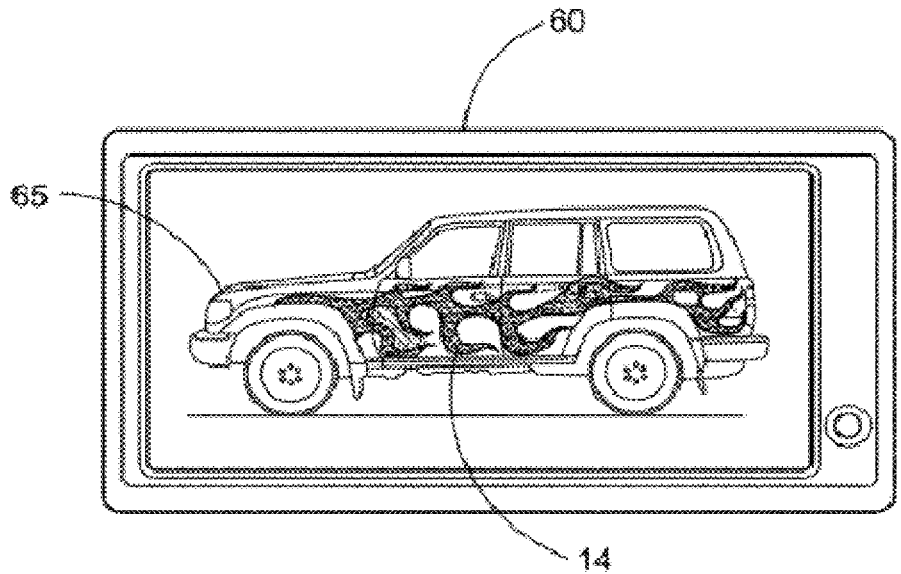
FIG. 12 depicts a conventional smartphone with the AUTO DECOR mobile app open illustrating a photo of a user's/customer's vehicle displaying paint pattern racing stripe product to show the user/customer what that product would look like on the vehicle following a purchase and installation of the paint pattern product.

FIG. 12 depicts a conventional smartphone 60 with a photo of a personal vehicle 65 with a fire type decorative paint pattern 14 on the side. The vehicles can be motorcycles, racing cars, vans, busses, trucks, mopeds, SUV's and all other types of vehicles other than automobiles.

Figure 13:
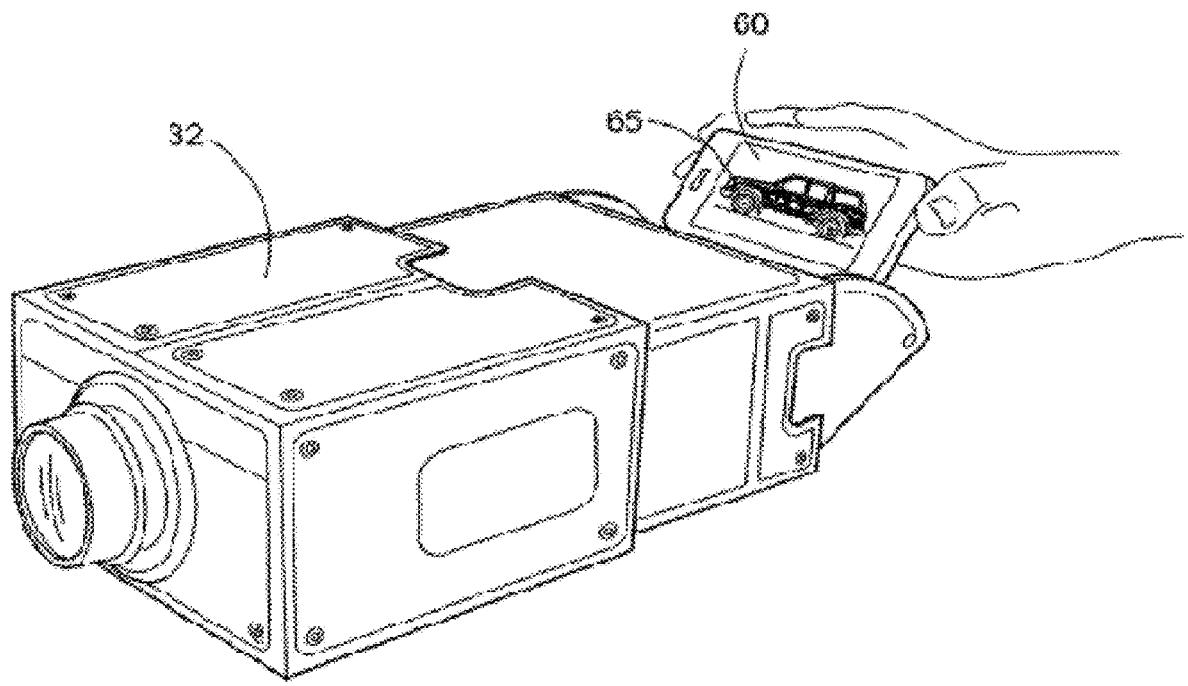
FIG. 13 depicts a portable smartphone projector with a user's hand inserting a smartphone into it for viewing the user's/customer's vehicle photo with superimposed wheel or paint pattern products on the vehicle photo.

FIG. 13 depicts a portable smartphone image projector 32 with a user's hand inserting that smartphone 60 into it to better view the photo of the user's/customer's vehicle 65 by projecting the images onto a wall or larger screen.

Figure 14:
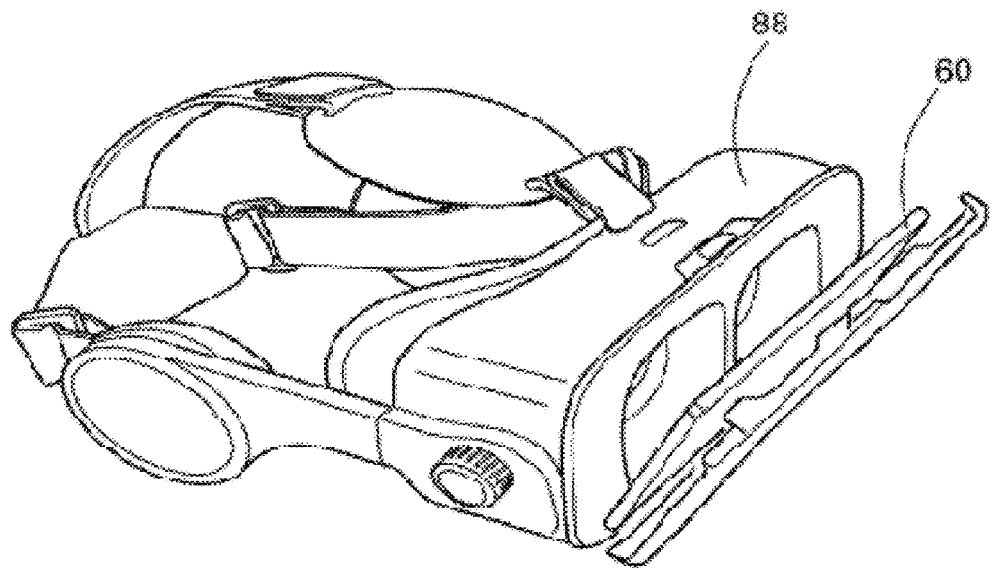
FIG. 14 depicts a virtual reality headset with a smartphone inserted into it for viewing the user's/customer's vehicle photo with superimposed wheel or paint pattern products on the vehicle photo.

FIG. 14 depicts a virtual reality (VR) headset 88 with a cell phone 60 inserted into it to better view the photo of the user's/customer's vehicle 65 by projecting the images within the VR headset, including 3D videos of the vehicle with products superimposed thereon.

The System and Method for Displaying Wheel Styles and Artwork on Vehicles 10A and 10B shown in the drawings and described in detail herein disclose arrangements of elements of particular construction and configuration for illustrating preferred embodiments of structure and method of operation the present design. It is to be understood, however, that elements of different construction and configuration and other arrangements thereof, other than those illustrated and described may be employed for providing the System and Method for Displaying Wheel Styles and Artwork on Vehicles 10A and 10B in accordance with the spirit of this application and such changes, alternations and modifications as would occur to those skilled in the art are considered to be within the scope of this application as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the process. The abstract is neither intended to define the capabilities of the system and methods, which are measured by the claims, nor is it intended to be limiting as to the scope of the application in any way.

Figure 15:
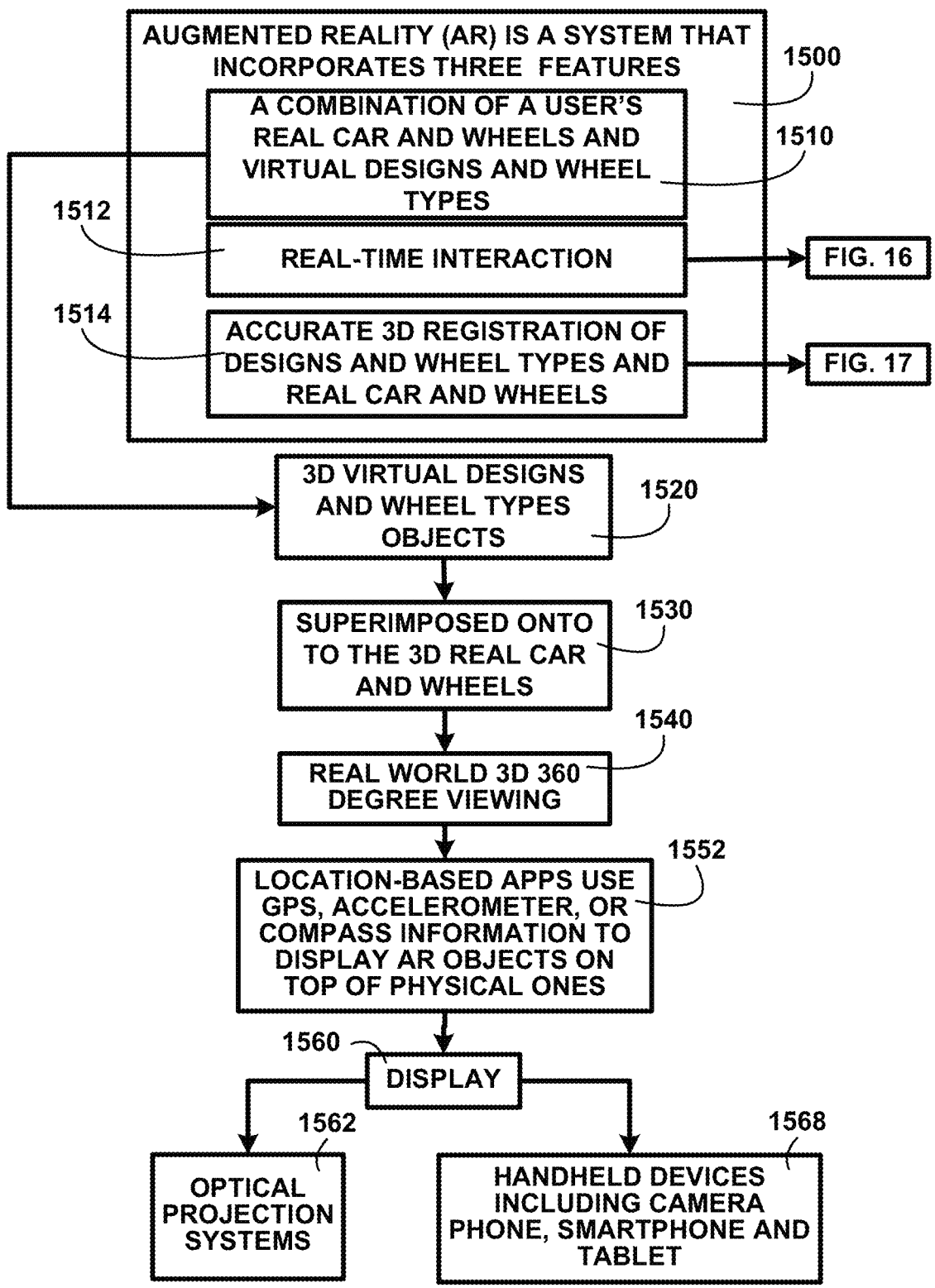
FIG. 15 shows a block diagram of an overview of augmented reality of one embodiment.

FIG. 15 shows a block diagram of an overview of augmented reality of one embodiment. FIG. 15 shows augmented reality (AR) is a system that incorporates three basic features 1500. One feature is a combination of a user's real car and wheels and virtual designs and wheel types 1510. Another feature is real-time interaction 1512 as described in FIG. 16. The third feature is accurate 3D registration of designs and wheel types and real car and wheels 1514 as described in FIG. 17. In the combination of real and virtual worlds 1510 a 3D virtual world 1520 is superimposed onto to the 3d real car and wheels 1530. The combined view is a real world 3D 360 degree viewing 1540 that includes the 3D virtual designs and wheel types objects 1520. In another embodiment location-based apps use GPS, accelerometer, or compass information to display AR objects on top of physical ones 1552. When the combination is completed the superimposed images are sent to a display 1560. The display 1560 can include optical projection systems 1562, handheld devices including camera phone, smartphone and tablet 1568 of one embodiment.

Figure 16A:
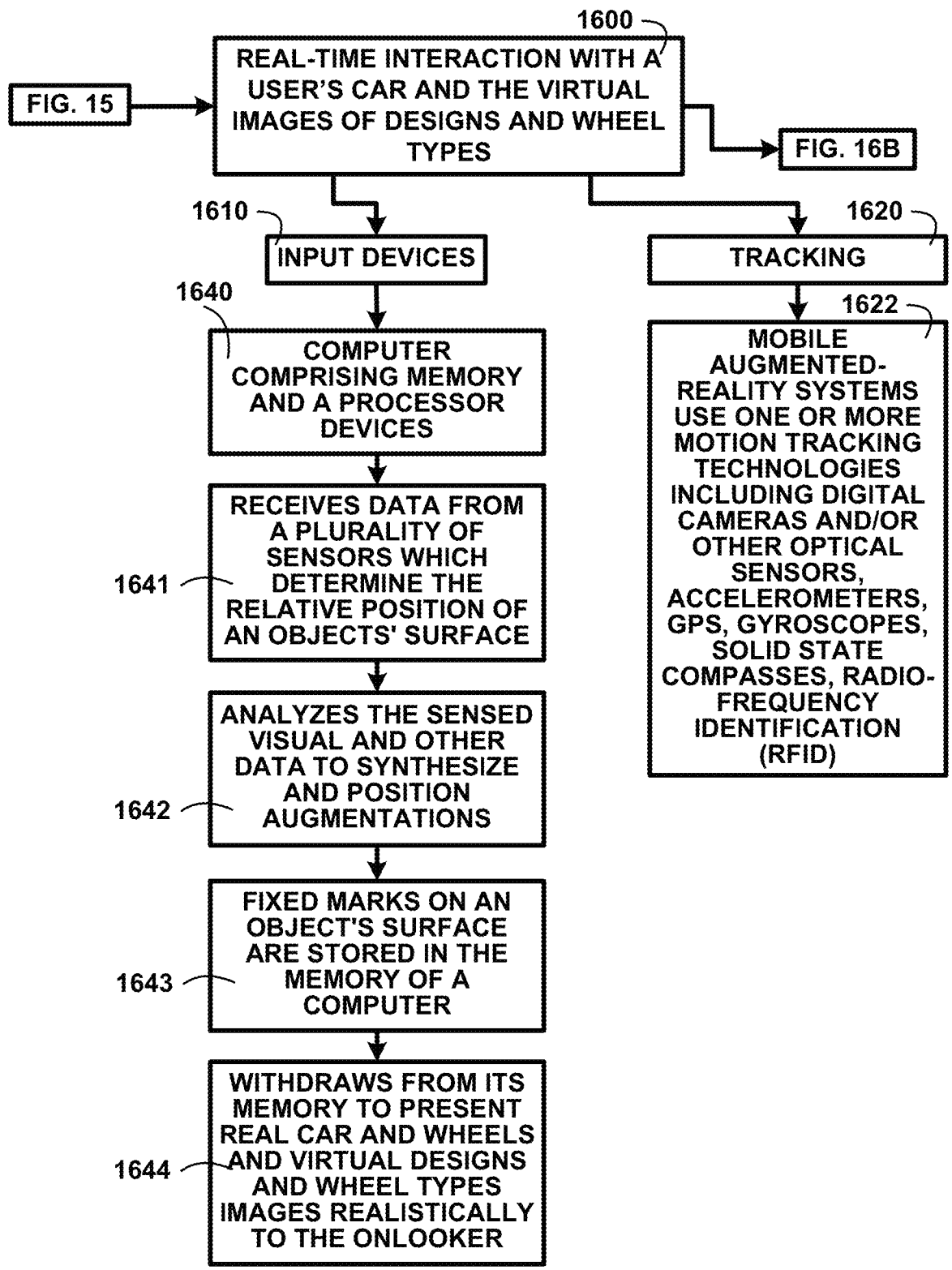
FIG. 16A shows a block diagram of an overview of real-time interaction of one embodiment.

FIG. 16A shows a block diagram of an overview of real-time interaction with a user's car and the virtual images of designs and wheel types of one embodiment. FIG. 16A shows a continuation from FIG. 15 with real-time interaction 1600 that in part is further described in FIG. 16B. Real-time interaction 1600 includes input devices 1610. Input devices 1610 include a computer comprising memory and a processor device 1640. The computer receives data from a plurality of sensors which determine the relative position of an objects' surface 1641 and analyzes the sensed visual and other data to synthesize and position augmentations 1642. Position augmentations use fixed marks on an object's surface are stored in the memory of a computer 1643. The computer withdraws from its memory to present real car and wheels and virtual designs and wheel types images realistically to the onlooker 1644 and takes the scanned environment then generates images or a video and puts it on the receiver for the observer to see 1645. Another real-time interaction 1600 is tracking 1620. Tracking 1620 uses mobile augmented-reality systems use one or more motion tracking technologies including digital cameras and/or other optical sensors, accelerometers, GPS, gyroscopes, solid state compasses, radio-frequency identification (RFID) 1622 of one embodiment.

Figure 16B:
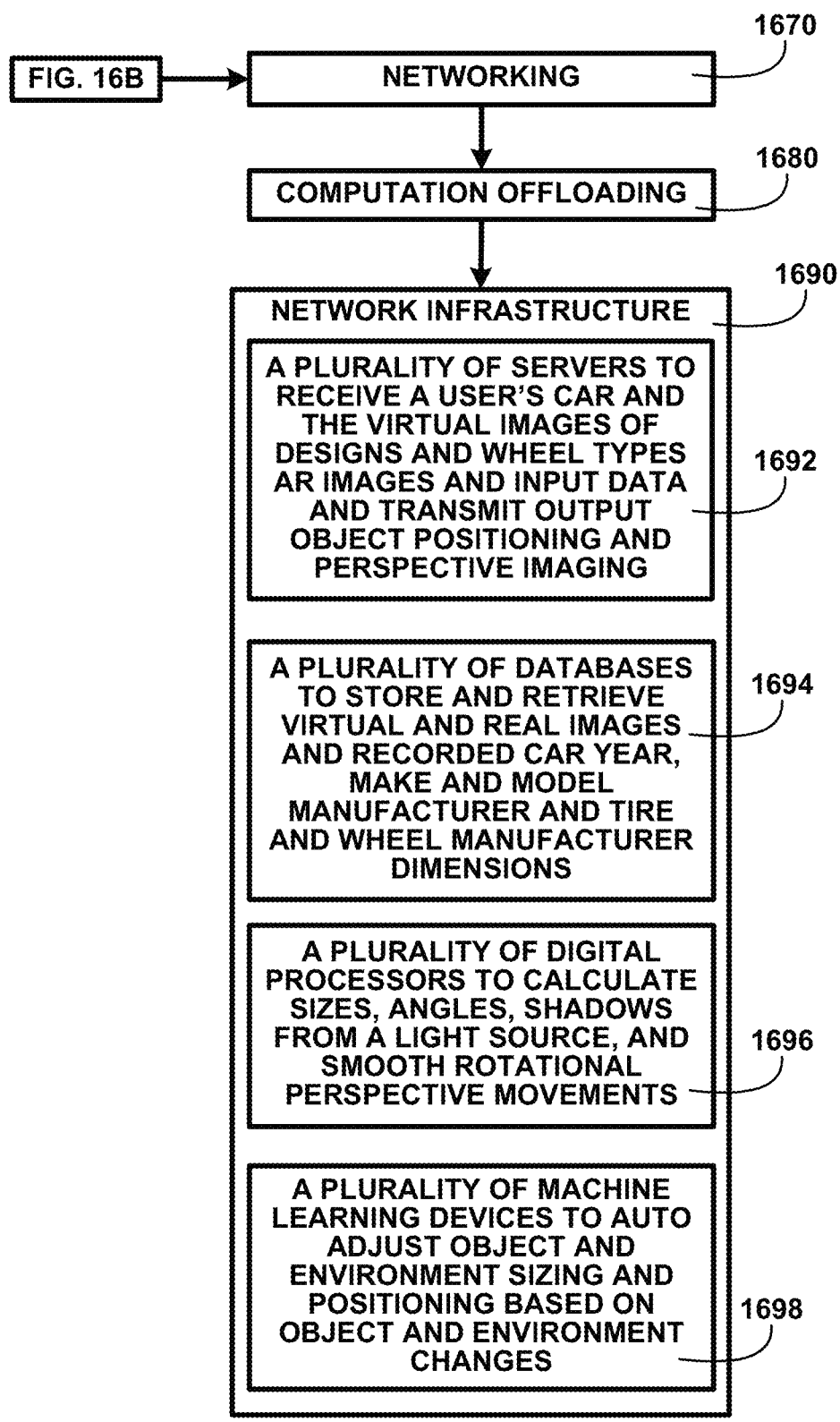
FIG. 16B shows a block diagram of an overview of networking of one embodiment.

FIG. 16B shows a block diagram of an overview of networking of one embodiment. FIG. 16B shows networking 1670 used for computation offloading 1680 to expand the capability of less robust systems in the accomplishing the computations of the AR environments and images. Network infrastructure 1690 includes a plurality of servers to receive a user's car and the virtual images of designs and wheel types AR images and input data and transmit output object positioning and perspective imaging 1692, a plurality of databases to store and retrieve virtual and real images and recorded car year, make and model manufacturer and tire and wheel manufacturer dimensions 1694, a plurality of digital processors to calculate sizes, angles, shadows from a light source, and smooth rotational perspective movements 1696, and a plurality of machine learning devices to auto adjust object and environment sizing and positioning based on object and environment changes 1698 of one embodiment.

Figure 17:
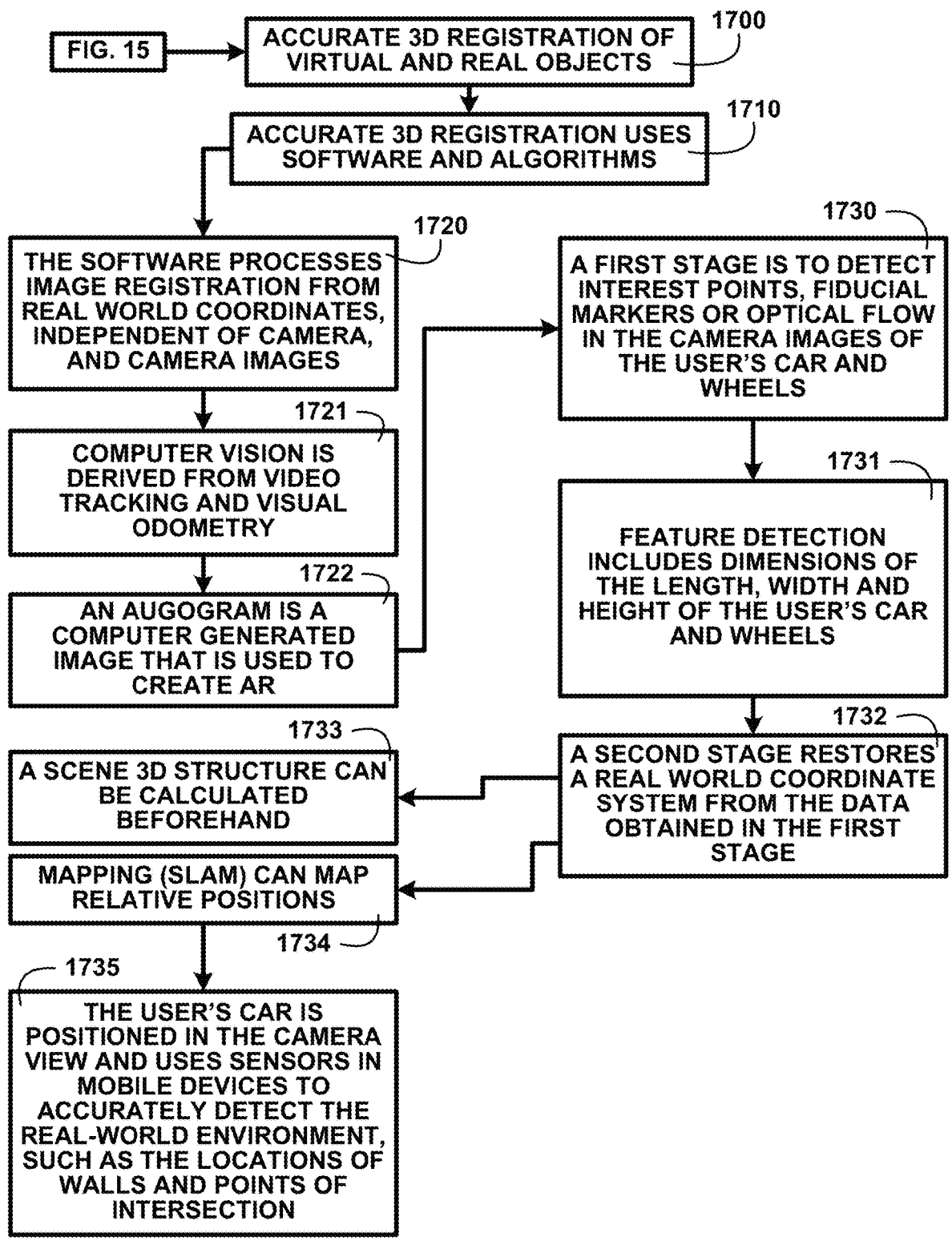
FIG. 17 shows a block diagram of an overview of accurate 3d registration of virtual and real objects of one embodiment.

FIG. 17 shows a block diagram of an overview of accurate 3D registration of virtual and real objects of one embodiment. FIG. 17 shows a continuation from FIG. 15 describing the accurate 3D registration of virtual and real objects 1700 feature. Accurate 3D registration uses software and algorithms 1710. The software processes image registration from real world coordinates, independent of camera, and camera images 1720. Computer vision is derived from video tracking and visual odometry 1721. An augogram is a computer generated image that is used to create AR 1722. A first stage is to detect interest points, fiducial markers or optical flow in the camera images 1730. Feature detection includes dimensions of the length, width and height of the user's car and wheels 1731. A second stage restores a real world coordinate system from the data obtained in the first stage 1732. In one embodiment a scene 3D structure can be calculated beforehand 1733. In another embodiment mapping (slam) can map relative positions 1734. The user's car is positioned in the camera view and uses sensors in mobile devices to accurately detect the real-world environment, such as the locations of walls and points of intersection 1735 of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A system for displaying different wheel styles and paint colors and paint pattern artwork choices to a potential purchaser, comprising:
   a mobile device having a camera and being coupled to a remote computer and configured for superimposing an image of wheel style products, paint colors products and paint pattern artwork products onto a live view of a potential purchaser's vehicle captured with the camera and displayed on a screen of the mobile device;
   a searchable database coupled to the remote computer having digital records of wheel style products, paint colors products and paint pattern artwork products to be selected by said potential purchaser;
   a mobile device application coupled to the remote computer and operating on the mobile device configured to modify superimpositions of wheel style products, paint colors, and paint pattern artwork on the vehicle displayed on the screen to conform wheel style products, paint colors, and paint pattern artwork images into variations in size, shape, and form to fit dimensional relationships for the parts of the vehicle to superimpose a realistic dimensionally positioned fit of a product depiction on the vehicle of a potential purchaser;
   a 3D camera device coupled to the camera and the mobile device application configured to capture a 3D image of the live view on the screen, wherein the mobile device application is configured to conform product images size, shape, and form and to form superimposed product images selected by the potential purchaser onto the 3D image of the potential purchaser's vehicle on the screen;
   a 3D viewer configured to access the 3D camera to provide a 3D view of the potential purchaser's selected database wheel products images superimposed within the 3D viewer onto the 3D image of the potential purchaser's vehicle;
   wherein the remote computer is configured to automatically query the searchable database for selected searchable database products suppliers data and establish communication in real-time with the potential purchaser and a dealer product suppliers to take steps for purchasing the product; and
   wherein the mobile device with the mobile device application automatically transmits a modified 3D image of the potential purchaser's vehicle with the product superimposed images to confirm with the dealer product suppliers selected products in styles, sizes, colors, brands, optimum transformed dimensional relationships for the parts including variations in size, materials, shape, form, function and manner of operation, assembly and use are available in stock to allow the potential purchaser to make an informed purchasing decision.

2. The system for displaying different wheel styles and paint colors and paint pattern artwork choices to a potential purchaser of claim 1, wherein the searchable database digital records includes dimensional data of the wheel style products, paint colors, and paint pattern artwork and dealer product suppliers real-time communication contact information downloadable to the potential purchaser's mobile device with the mobile device application installed and displayable on the mobile device screen.

3. The system for displaying different wheel styles and paint colors and paint pattern artwork choices to a potential purchaser of claim 1, wherein the remote computer is configured to modify 3D views of the potential purchaser's selected wheel style products, paint colors, and paint pattern artwork to superimpose a realistic dimensionally positioned fit of the 3D views images of the selected products with the potential purchaser's mobile device 3D viewer-device with the mobile device application installed and display on the mobile device screen the modified 3D views images of the selected products superimposed on the 3D image of the potential purchaser's vehicle.

4. The system for displaying different wheel styles and paint colors and paint pattern artwork choices to a potential purchaser of claim 1, wherein the potential purchaser's selected of wheel style products, paint colors, and paint pattern artwork are displayed using the potential purchaser's mobile device with mobile device application installed coupled to the 3D viewer and are displayed by superimposing an image of the potential purchaser's selected wheel style products, paint colors and paint pattern artwork onto the 3D image of the potential purchaser's vehicle using the potential purchaser's mobile device configured with a 3D camera device, and further wherein the display is viewed on the screen of the potential purchaser's mobile device.

5. The system for displaying different wheel styles and paint colors and paint pattern artwork choices to a potential purchaser of claim 1, wherein the one or more product images of wheel style products, paint colors, and paint pattern artwork are superimposed onto the 3D image of the potential purchaser's vehicle.

* * * * *